US008589070B2

(12) United States Patent
Ban et al.

(10) Patent No.: US 8,589,070 B2
(45) Date of Patent: Nov. 19, 2013

(54) APPARATUS AND METHOD FOR COMPENSATING POSITION INFORMATION IN PORTABLE TERMINAL

(75) Inventors: Ji-Hye Ban, Gyeonggi-do (KR); Gye-Joong Shin, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 13/476,213

(22) Filed: May 21, 2012

(65) Prior Publication Data

US 2012/0296566 A1  Nov. 22, 2012

(30) Foreign Application Priority Data

May 20, 2011 (KR) .................. 10-2011-0047824
May 18, 2012 (KR) .................. 10-2012-0052824

(51) Int. Cl.
    *G01C 21/00* (2006.01)
(52) U.S. Cl.
    USPC .......................................... 701/445; 701/446
(58) Field of Classification Search
    USPC ................................................ 701/445–446
    See application file for complete search history.

(56) References Cited

U.S. PATENT DOCUMENTS

| | | | |
|---|---|---|---|
| 5,189,619 A * | 2/1993 | Adachi et al. ................ 701/96 |
| 5,928,294 A * | 7/1999 | Zelinkovsky ................ 701/24 |
| 6,032,097 A * | 2/2000 | Iihoshi et al. ................ 701/96 |
| 6,249,232 B1 * | 6/2001 | Tamura et al. ............... 340/902 |
| 6,292,725 B1 * | 9/2001 | Kageyama et al. ........... 701/23 |
| 6,615,137 B2 * | 9/2003 | Lutter et al. ................ 701/301 |
| 6,650,252 B2 * | 11/2003 | Miller, Jr. ................ 340/989 |
| 6,681,157 B2 * | 1/2004 | Kageyama .................. 701/1 |
| 7,382,274 B1 * | 6/2008 | Kermani et al. ............ 340/901 |
| 7,383,121 B2 * | 6/2008 | Shinada ................... 701/117 |
| 7,617,041 B2 * | 11/2009 | Sera ....................... 701/119 |
| 2005/0195383 A1 * | 9/2005 | Breed et al. ............... 356/4.01 |
| 2007/0005243 A1 | 1/2007 | Horvitz et al. |
| 2007/0135989 A1 * | 6/2007 | Hengst .................... 701/117 |

FOREIGN PATENT DOCUMENTS

| | | | |
|---|---|---|---|
| KR | 10-2008-0014443 A | 2/2008 |
| WO | 02-39063 A1 | 5/2002 |
| WO | 2008-140144 A1 | 11/2008 |
| WO | 2009/060776 A1 | 5/2009 |

* cited by examiner

*Primary Examiner* — Hussein A. Elchanti
(74) *Attorney, Agent, or Firm* — Cha & Reiter, LLC (57) ABSTRACT

An apparatus and a method for estimating position information in a portable terminal are provided. A position estimation method includes estimating position information of the portable terminal; firstly compensating for an estimation error of the position information of the portable terminal according to motion information of the portable terminal; secondarily compensating for the firstly compensated position information according to a map matching scheme; and storing the position information of the compensated estimation error as the position information of the portable terminal.

20 Claims, 10 Drawing Sheets

APPARATUS AND METHOD FOR COMPENSATING POSITION INFORMATION IN PORTABLE TERMINAL

CLAIM OF PRIORITY

The present application claims the benefit to a Korean patent application filed in the Korean Intellectual Property Office on May 20, 2011 and assigned Serial No. 10-2011-0047824, and on May 18, 2012 assigned Serial No. 10-2012-0052824, the entire disclosure of which is hereby incorporated by reference.

TECHNICAL FIELD OF THE INVENTION

The present invention relates generally to an apparatus and a method for estimating position information of a portable terminal.

BACKGROUND OF THE INVENTION

As wireless communication technologies advance, various services using the position information of the portable terminal are growing. For example, the portable terminal can provide a service for searching desired establishments and attraction near the currently located area. Also, using the position information of the portable terminal, it is possible to locate a friend or a user himself/herself, or to efficiently arrange and manage workers and vehicles. Further, using the position information of the portable terminal, a service can be implemented to inform a guardian of a child of current position or a moving path of the child or an object.

The portable terminal typically estimates the position information using a Global Navigation Satellite System (GNSS) and a triangulation.

Using the GNSS, the portable terminal can estimate its position information by measuring a phase of a satellite signal sent from a GNSS satellite, or by estimating a code of the satellite code and measuring a distance to the satellite.

However, the portable terminal using the GNSS cannot receive the accurate satellite signal in a shadow zone of the satellite signal, for example, inside or near a building or in built-up areas, and thus cannot accurately estimate its position.

SUMMARY OF THE INVENTION

The present invention addresses the above-discussed deficiencies of the prior art by providing an improved way of estimating the position information of a portable terminal.

Another aspect of the present invention is to provide an apparatus and an improved method of estimating the position information of a portable terminal in a GNSS shadow zone.

Yet another aspect of the present invention is to provide an apparatus and a method of improving the estimation of a portable terminal position by compensating for an estimation error of the position information of a portable terminal caused by a multi-path delay, signal attenuation, or interference, for example, using motion information of the portable terminal.

Still another aspect of the present invention is to provide an apparatus and a method of improving the estimation of a portable terminal position by compensating the position information of a portable terminal caused by a multi-path delay, signal attenuation, or interference using motion information of the portable terminal and map matching scheme.

A further aspect of the present invention is to provide an apparatus and a method for compensating for an estimation error of the position information estimated in a GNSS shadow zone using motion information of the portable terminal.

A further aspect of the present invention is to provide an apparatus and a method for compensating for an estimation error of the position information estimated in a GNSS shadow zone using motion information of the portable terminal and map matching scheme.

According to one aspect of the present invention, a method for estimating position information in a portable terminal includes estimating the position information of a portable terminal; compensating an estimation error of the position information by considering motion information of the portable terminal; compensating the estimation error of the firstly compensated position information according to a map matching scheme; and storing the position information of the compensated estimation error as the position information of the portable terminal.

According to another aspect of the present invention, an apparatus for estimating position information in a portable terminal includes a position estimator for estimating position information of the portable terminal; a sensing module for detecting motion information of the portable terminal; a position compensator for compensating for an estimation error of the position information estimated by the position estimator by considering motion information of the portable terminal detected by the sensing module and compensating the estimation error of the firstly compensated position information according to a map matching scheme using map data; and a storage unit for storing the position information compensated by the position compensator as the position information of the portable terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a technique for compensating an estimation error of the position information in a portable terminal.

Hereinafter, the portable terminal represents small terminals capable of estimating its position, and embraces a mobile communication terminal, a Personal Data Assistant (PDA), an MP3 player, a navigation device, and a portable computer.

It is assumed that a mobile communication terminal compensates an estimation error of the position information. Yet, other portable terminals mentioned above can compensate the estimation error of the position information according to the teachings of the present invention.

The portable terminal can estimate its position using a Global Navigation Satellite System (GNSS), a WiFi Positioning System (WPS), a Network Location Provider (NLP), a triangulation position method, and a position recognition method using a beacon signal.

In the specification, it is assumed that the position information is estimated using the Global Positioning System (GPS) among the GNSS for illustrative purposes; however, it should be noted that the estimation error of the position information according to the teachings of the present invention can be applied using other methods mentioned above.

Figure 1:
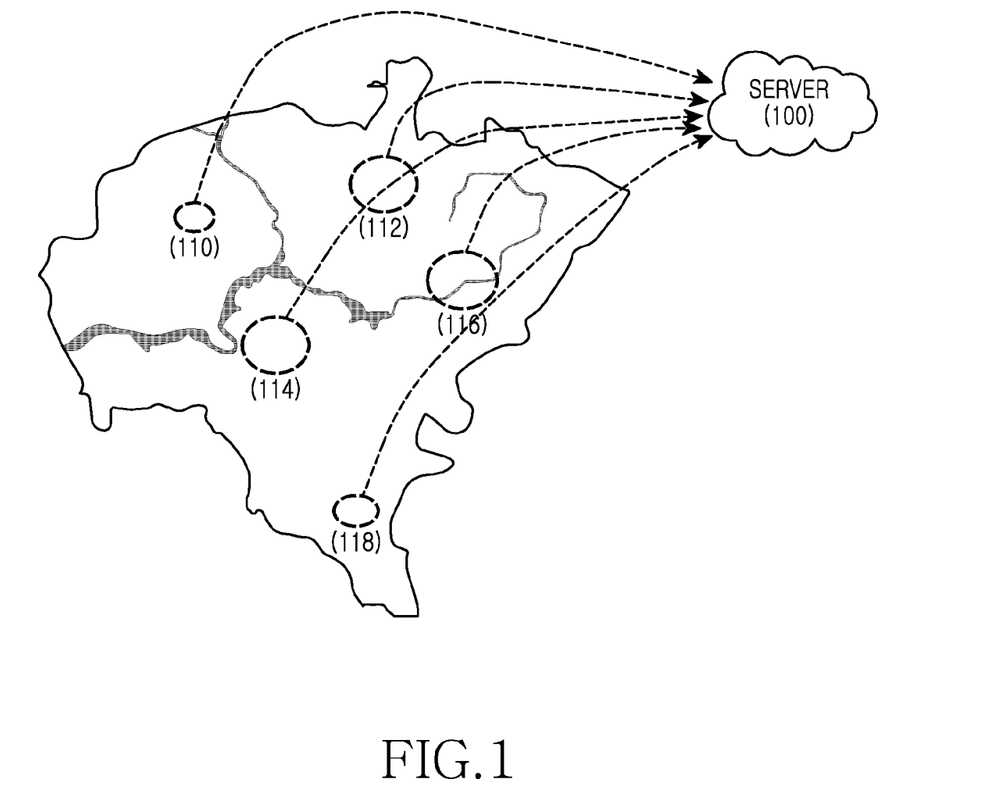
FIG. 1 illustrates GPS shadow zones according to an exemplary embodiment of the present invention.

Briefly, according to the teachings of the present invention, the portable terminal selectively compensates the position information estimated using the GPS. That is, when the accurate position information can be estimated using the GPS, the portable terminal estimates the position information using the GPS. However, when the portable terminal travels in a GPS shadow zone and the accurate position information cannot be estimated using the GPS, the portable terminal according to the present invention compensates the estimation error of the position information determined using the GPS by identifying GPS shadow zones based on simplified map information of GPS shadow zones, as shown in FIG. 1. Herein, the GPS shadow zone indicates a region, such as metropolitan area, where the portable terminal cannot receive the accurate satellite signal because of at least one of multipath, signal attenuation, and signal interference.

A detailed description of operative process of compensating for more accurate estimation of portable terminal position will be provided hereinafter.

FIG. 1 depicts the GPS shadow zones to which the teaching of the present invention is applicable in accordance with an exemplary embodiment of the present invention.

As shown in FIG. 1, a server 100 stores map information representing the GPS shadow zones 110 through 118. The server 100 also has map information including roads within the GPS shadow zones 110 through 118. It is appreciated by those skilled in the art that map information of road and structures defining a specific zone is well known in the art, thus a discussion thereof is omitted. Note that the server 110 can be updated with the latest geographical information for any changes in the road, buildings, and structure that would interfere with the reception of GPS signals.

In operation, when the portable terminal requests the map information, the server 100 transmits the map information indicating the GPS shadow zones to the portable terminal. Herein, the map information indicating the GPS shadow zones may be formed as a table. For example, the map information indicating the GPS shadow zones may be generated as a table including coordinate information of the GPS shadow zones.

Figure 2:
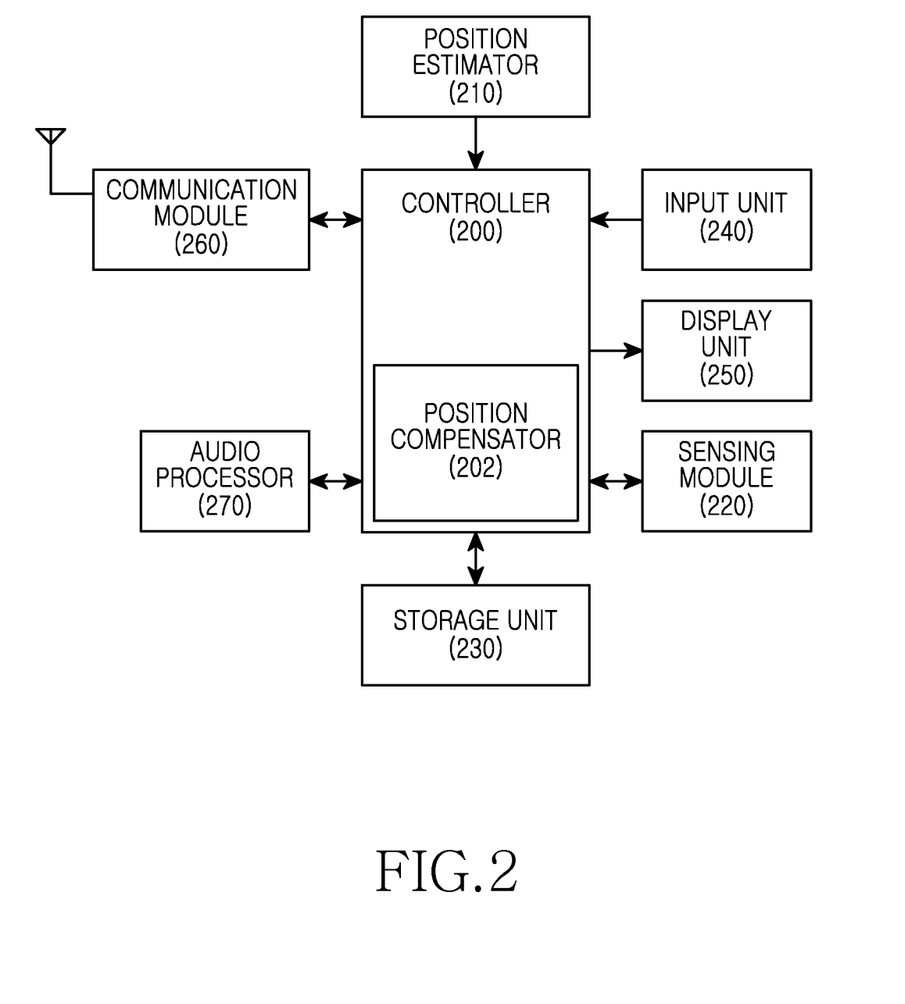
FIG. 2 illustrates a portable terminal according to an exemplary embodiment of the present invention.

FIG. 2 is a block diagram of a portable terminal according to an exemplary embodiment of the present invention.

As shown in FIG. 2, the portable terminal includes a controller 200, a position compensator 202, a position estimator 210, a sensing module 220, a storage unit 230, an input unit 240, a display unit 250, a communication module 260, and an audio processor 270.

The position estimator 210 estimates the position of the portable terminal using a satellite signal provided from a GPS satellite. Note that the received satellite signals may contain inaccurate location of the terminal due to a multi-path delay or interference.

The sensing module 220 detects the motion state of the portable terminal. To this end, the sensing module 220 includes at least one of an acceleration sensor, a geomagnetic sensor, a gyroscope sensor, and an altitude sensor. The acceleration sensor can detect the movement and the travel speed of the portable terminal. The geomagnetic sensor and the gyroscope sensor can detect the heading direction of the portable terminal. The altitude sensor can detect whether the portable terminal travels on an underpass or on an overpass by measuring an altitude value of the portable terminal. The sending module 220 of these types is well known by artsians, thus omitted.

The controller 200 controls overall operations of the portable terminal.

In operation, the controller 200 determines whether to compensate the estimation error of the position information caused by the position estimator 210. For example, the controller 200 determines whether the portable terminal lies in the GPS shadow zone using the position information provided from the position estimator 210. When the portable terminal is in the GPS shadow zone, the controller 200 controls a position compensator 202 to compensate the estimation error caused by the interference associated with the GPS shadow zone from the position estimator 210. When the portable terminal does not travel within or through the GPS shadow zone, the controller 200 does not preform the error estimation on the output of the position estimator 210.

Using the position information provided from the position estimator 210, the controller 200 provides a Location Based Service (LBS) of the portable terminal. When controlling the position compensator 202 to compensate for the estimation error of its position information, the controller 200 provides the LBS of the potable terminal using the position information that has been compensated by the position compensator 202.

The position compensator 202 compensates the position estimation error of the position information provided from the position estimator 210 using sensing data output from the sensing module 220 and the map data of the travel region of the portable terminal. Herein, the sensing data includes motion information, such as a movement of the portable terminal, heading direction of the portable terminal, travel speed of the portable terminal, and altitude change of the portable terminal, of the portable terminal detected by the sensing module 220.

Figure 3:
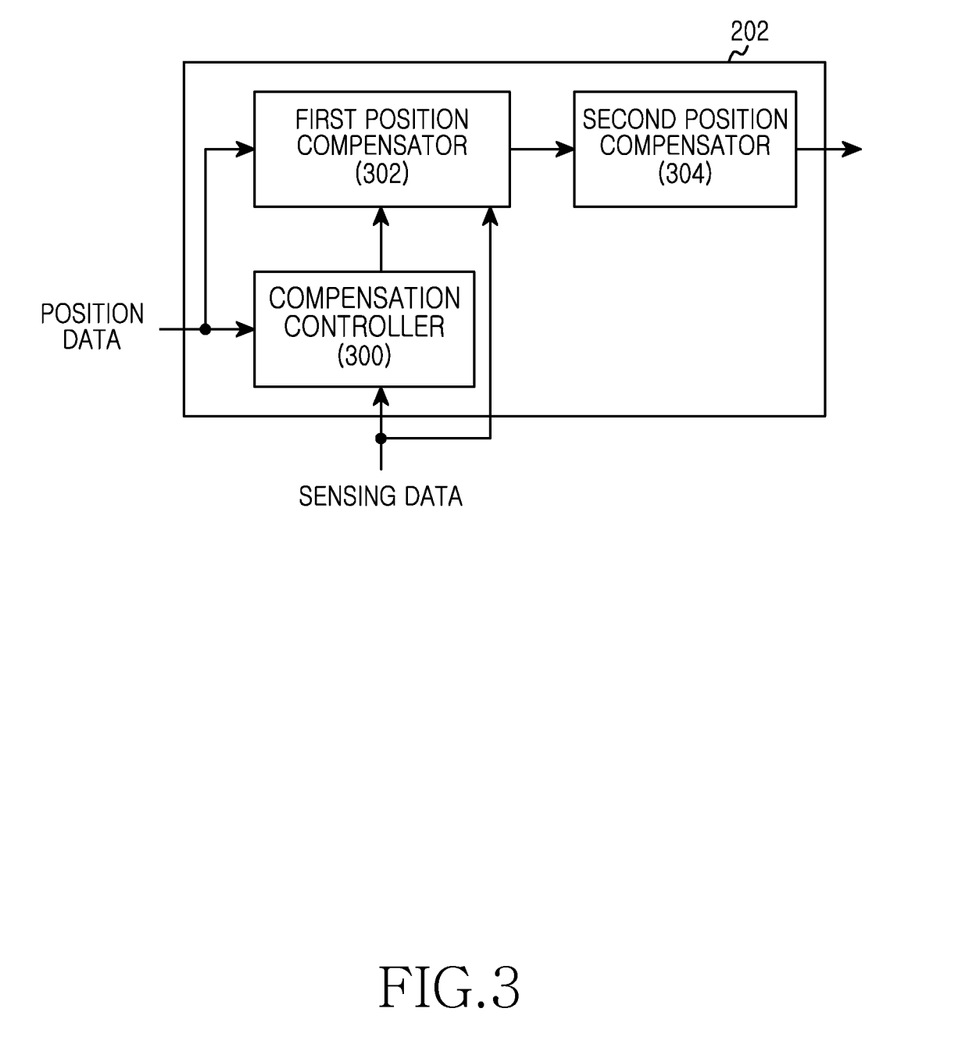
FIG. 3 illustrates a position compensator of the portable terminal according to an exemplary embodiment of the present invention.

The position compensator 202 is constructed as shown in FIG. 3 and serves to compensate estimation error of the position information of the terminal provided from the position estimator 210. That is, the position compensator 202 operates only to compensate for the estimation error of the position information estimated by the position estimator 210 under control of the controller 200. A detailed explanation will be provided later with reference to FIGS. 4-10.

The storage unit 230 can include a program storage for storing a program to control the operations of the portable terminal, and a data storage for storing data generating in the program execution. For example, the data storage of the storage unit 230 stores the map information indicating the GPS shadow zones. However, when the storage unit 230 contains no map information indicating the GPS shadow zones of the travel region of the portable terminal, the storage unit 230 stores the map information indicating the GPS shadow zones received from a server, to the data storage under the control of the controller 200. Herein, the map information indicating the GPS shadow zones can be generated as shown in FIG. 1 or in a table format.

The data storage of the storage unit 230 also stores map data that is used to perform the compensation of the position estimation error. Alternatively, the storage unit 230 can receive such map data from a server under the control of the controller 200. Herein, the map data indicates detailed information of the travel path of the terminal or may be a simplified map data including only the road information.

The input unit 240 provides input data generated by the user's selection to the controller 200.

The display unit 250 displays status information, a menu screen, and story information of the portable terminal under the control of the controller 200. The display unit 250 includes a touch screen.

The communication module 260 processes voice and data communication signals transmitted and received via an antenna.

The audio processor 270 processes an audio signal input and output through the portable terminal.

FIG. 3 is a detailed block diagram of the position compensator 202 of the portable terminal according to an exemplary embodiment of the present invention.

As shown in FIG. 3, the position compensator 202 includes a compensation controller 300, a first position compensator 302, and a second position compensator 304.

The compensation controller 300 determines whether to apply first position compensation the position information provided from the position estimator 210. For example, the compensation controller 300 determines whether to perform the first position compensation using accuracy information of the satellite signal received at the position estimator 210.

In detail, the compensation controller 300 determines whether to perform the first position compensation by comparing an error range of the accuracy information and a reference error range. When the error range of the accuracy information is greater than the reference error range, the compensation controller 300 recognizes that the position information provided from the position estimator 210 is unreliable. Hence, the compensation controller 300 determines to apply the first position compensation to the position information provided from the position estimator 210. Herein, the error range indicates an error range of the position information estimated by the portable terminal using the satellite signal.

For example, the compensation controller 300 may determine whether to conduct the first position compensation using the sensing data provided from the sensing module 220. In more detail, when the position information provided from the position estimator 210 falls outside the reference error range, the compensation controller 300 recognizes that the position information provided from the position estimator 210 is unreliable. Thus, the compensation controller 300 determines to apply the first position compensation on the position information provided from the position estimator 210. Further, when detecting that the portable terminal is stationary, the compensation controller 200 controls the first position compensator 302 and the second position compensation 304 not to compensate for the position information provided from the position estimator 210.

As explained above, the first position compensator 302 selectively applies the first compensation to the position information provided from the position estimator 210 under the control of the compensation controller 300.

In contrast, when the compensation controller 300 determines that the position information provided from the position estimator 210 is reliable, the first position compensator 302 sends the position information provided from the position estimator 210, to the second position compensator 304. That is, the first position compensator 302 does not apply the first compensation to the position information provided from the position estimator 210. For example, when not traveling in the GPS shadow zone based on the map information received therein, the portable terminal recognizes that the position information estimated in step 501 is reliable.

Meanwhile, when the compensation controller 300 determines that the position information provided from the position estimator 210 is unreliable, the first position compensator 302 firstly compensates the position information provided from the position estimator 210 using the sensing data provided from the sensing module 220. For example, the portable terminal can detect its heading direction and travel speed through the sensing module 220. Hence, the first position compensator 302 applies the first compensation to the unreliable position information using the heading direction and the travel speed of the portable terminal detected through the sensing module 220.

The second position compensator 304 secondarily compensates the position information by matching the position information output from the first position compensator 302, to the map according to a map matching scheme. That is, the second position compensator 304 conducts the secondary compensation of the position information by matching the position information provided from the first position compensator 302 to the road on the map. Thereafter, using the position information provided from the position estimator 210, the controller 200 provides a Location Based Service (LBS) of the portable terminal.

Figure 8:
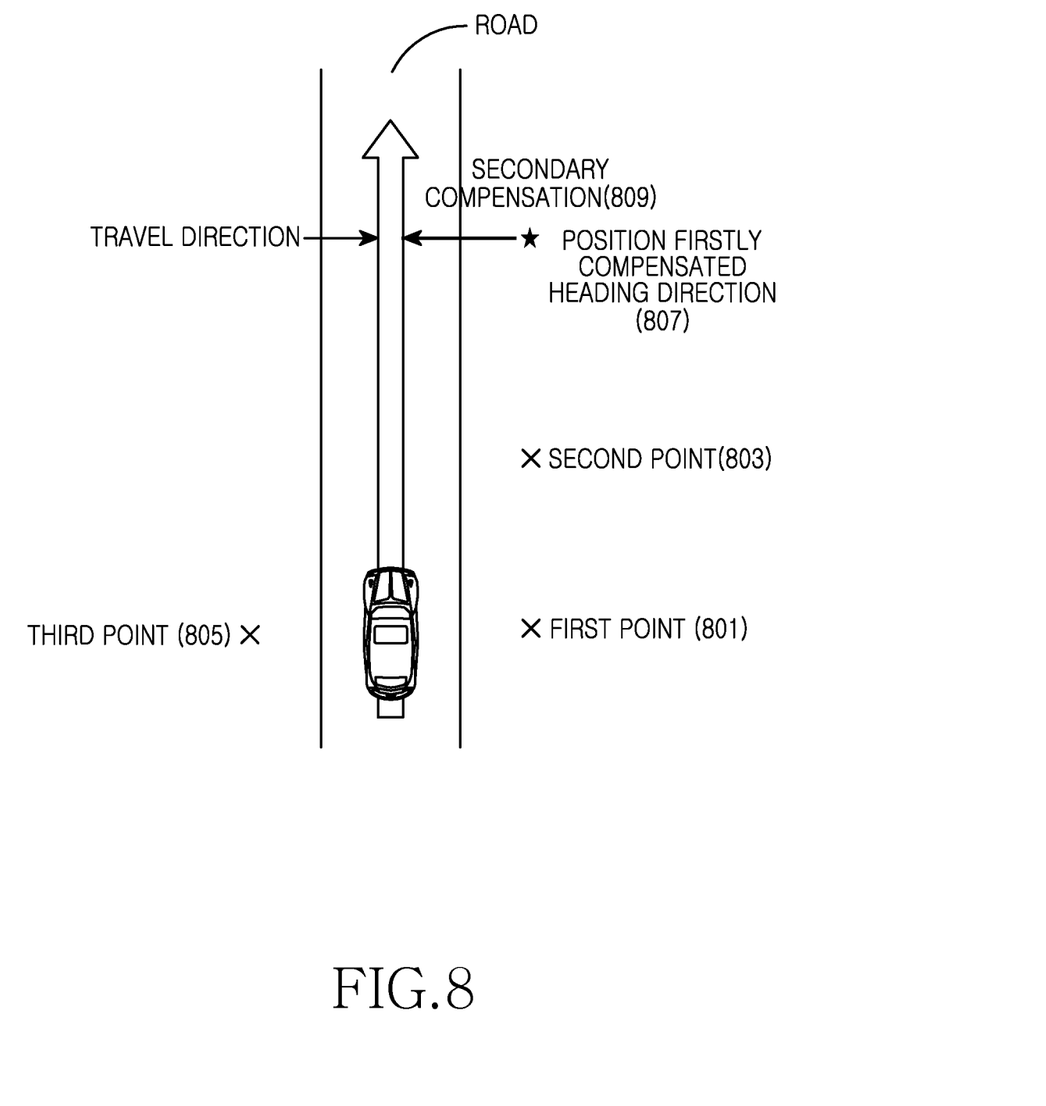
FIG. 8 illustrates map information for compensating for the estimation error of the position information according to one exemplary embodiment of the present invention.

For example, it is assumed that the position estimator 210 of the portable terminal which travels in a high rise buildings area estimates a first point 801, a second point 803, and a third point 805 in sequence using the satellite signals as shown in FIG. 8. Note that terminal knows it's traveling through the shadow zone area based on the road map information received therein, thus determines these estimate points are not reliable. Thus, when the compensation controller 300 recognizes using the sensing data that the portable terminal travels straight after the second point 803, the compensation controller 300 recognizes that the third point 805 falls outside of its reference error range since the first and second forms the straight line or traveling path of the terminal and the third point 805 s not within the range of the extended straight line from 801 and 803. Hence, the compensation controller 300 determines to apply the first compensation to the third point 805 estimated by the position estimator 210. To this end, under the control of the compensation controller 300, the first position compensator 302 firstly compensates for the third point 805 to a point 807 by considering the heading direction and the travel speed of the portable terminal.

Thereafter, the second position compensator 304 applies the secondary compensation to the position information by matching the point 807 firstly compensated by the first position compensator 302 to the road on the map and then stored, and thereafter, the new the portable terminal provides the LBS using the stored position information. Although it is not depicted, the second position compensator 304 may match the first point 801 and the second point 803 provided from the first position compensator 302 to the road on the map.

Figure 9:
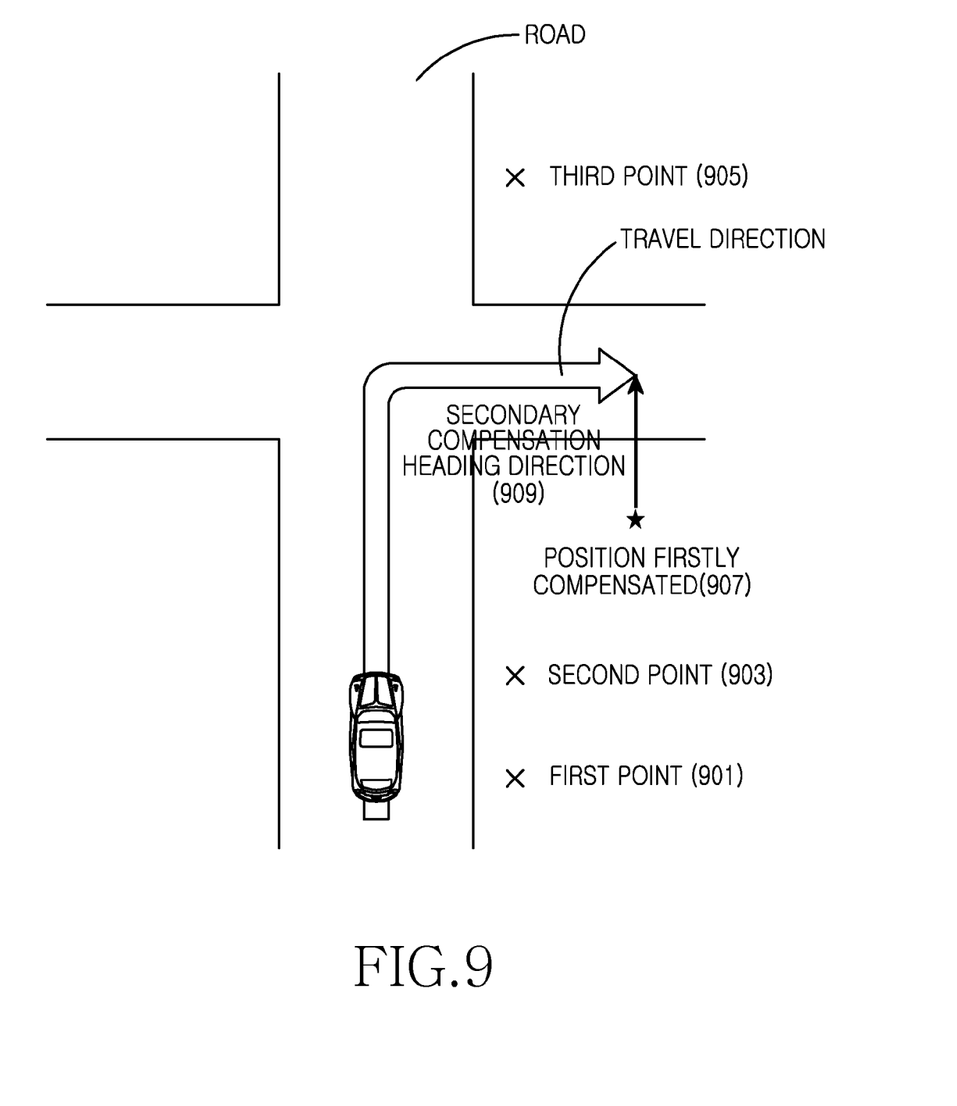
FIG. 9 illustrates map information for compensating for the estimation error of the position information according to another exemplary embodiment of the present invention.

FIG. 9 illustrates another scenario whereto the teaching of the present invention is applicable. As shown, it is assumed that the position estimator 210 of the portable terminal which travels through high rise building area estimates a first point 901, a second point 903, and a third point 905 in sequence using the satellite signals as shown in FIG. 9. When the compensation controller 300 recognizes using the sensing data that the portable terminal turns right after the second point 903, the compensation controller 300 recognizes that the third point 905 falls outside its reference error range. Hence, the compensation controller 300 determines to apply the first compensation to the third point 905 estimated by the position estimator 210.

Under the control of the compensation controller 300, the first position compensator 302 firstly compensates for the third point 905 to a point 907 by considering the heading direction and the travel speed of the portable terminal.

The second position compensator 304 applies the secondary compensation to the position information by matching the point 907 firstly compensated by the first position compensator 302 to the road on the map and the matched position information is stored. The portable terminal provides the LBS using the stored position information. Although it is not depicted, the second position compensator 304 may match the first point 901 and the second point 903 provided from the first position compensator 302 to the road on the map.

Figure 10:
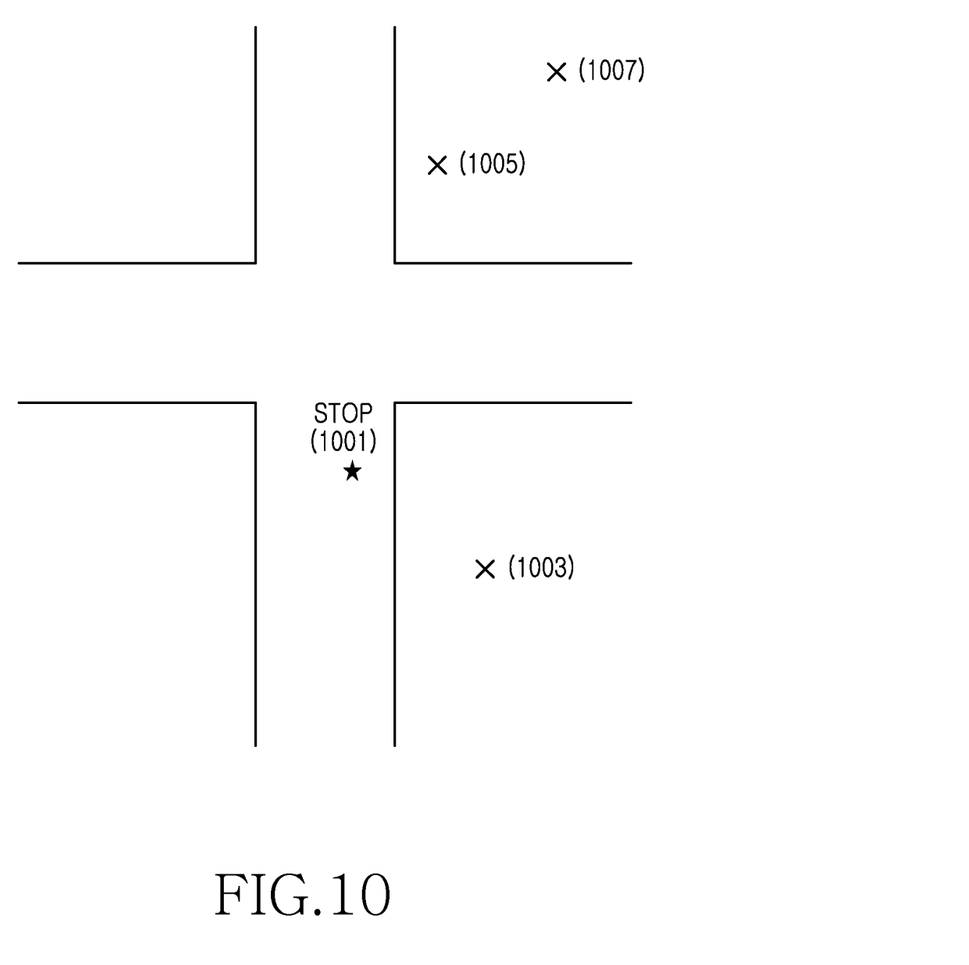
FIG. 10 illustrates map information for compensating for the estimation error of the position information according to yet another exemplary embodiment of the present invention.

FIG. 10 illustrates yet another scenario whereto the teaching of the present invention is applicable. As shown, it is assumed that the position estimator 210 of the portable terminal which is stationary in a downtown of high rise building area estimates position information 1003, 1005, and 1007 in sequence using the satellite signals as shown. In this case, the compensation controller 300 controls to hold the position information 1001 compensated when the portable terminal is stationary. That is, the compensation controller 300 controls the first position compensator 302 and the second position compensator 304 not to compensate for the position information 1003, 1005, and 1007 estimated when the portable terminal is stationary.

Figure 4:
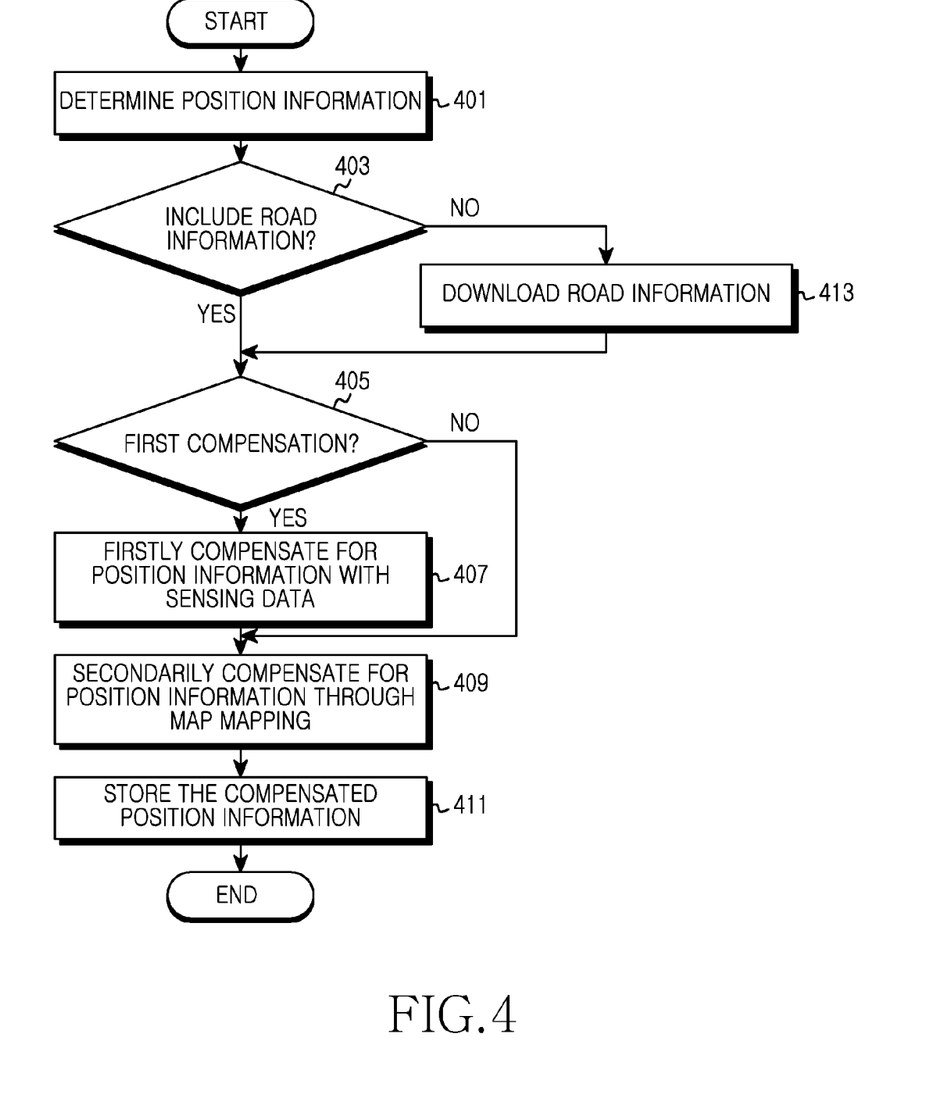
FIG. 4 illustrates a method for compensating for an estimation error of position information in the portable terminal according to one exemplary embodiment of the present invention.

Now, a method for compensating for the estimation error of the position information estimated using the satellite signal in the portable terminal is explained. Here, it is assumed that the portable terminal has GPS shadow zone information. When the portable terminal does not have the GPS shadow zone information, it downloads the simplified map data including the GPS shadow zone information from a separate server, as shown in FIG. 1. FIG. 4 illustrates a method for compensating the position information in the portable terminal according to one exemplary embodiment of the present invention.

Referring to FIG. 4, the portable terminal estimates its position in step 401. For example, the portable terminal estimates its position based on reference location information obtained using the WPS, the NLP, and a cell identifier. Alternatively, the portable terminal may estimate its position based on GPS data received from the GPS satellite.

In step 403, the portable terminal determines whether it has the map data of the travel region of the portable terminal.

When having the map data of the travel region of the portable terminal, the portable terminal determines whether to apply the first compensation to the position information estimated in step 401. That is, the portable terminal determines whether the position information estimated in step 401 is reliable. In so doing, the portable terminal may determine whether to perform the first position compensation using at least one of the sensing data provided from the sensing module 220 and the accuracy information of the satellite signal. For example, it is assumed that the portable terminal which travels in the downtown area of high rise buildings sequentially estimates the first point 801, the second point 803, and the third point 805 using the satellite signals as shown in FIG. 8. When the portable terminal recognizes using the sensing data that the portable terminal travels straight after the second point 803, the portable terminal recognizes that the third point 805 falls outside the reference error range. In this case, the portable terminal determines to apply the first compensation to the third point 805.

When not having the map data of the travel region of the portable terminal, the portable terminal downloads the map data of its travel region from a server in step 413. In so doing, the map data includes any one of the detailed map data including building and road information to guide the path, and the simplified map data including only the simplified road data to compensate for the estimation error alone of the position information.

After downloading the map data from the server, the portable terminal determines whether to apply the first compensation to the position information estimated in step 401, in step 405.

When not applying the first compensation to the position information, the portable terminal secondarily compensates for the position information estimated in step 401 using the map matching in step 409. For example, when not firstly compensating the first point 801 and the second point 803 of FIG. 8, the portable terminal may match the first point 801 and the second point 803 to the road on the map.

Meanwhile, for the first compensation of the position information, the portable terminal firstly compensates the estimation error of the position information estimated in step 401, using the sensing data indicating the motion information of the portable terminal in step 407. For example, the portable terminal firstly compensates for the third point 805 of FIG. 8 to the position 807 by considering its heading direction and travel speed.

In step 409, the portable terminal secondarily compensates for the estimation error of the position information by matching the firstly compensated position information to the map data. For example, when the third point 805 is firstly compensated to the position 807 in FIG. 8, the portable terminal applies the secondary compensation to the position information by matching the firstly compensated point 807 to the road on the map.

In step 411, the portable terminal stores the secondarily compensated position information as its position information. In so doing, the portable terminal can provide the LBS such as path guide and position determine, using the stored position information.

Next, the portable terminal finishes this process.

In this embodiment, the portable terminal compensates for the estimation error of the position information estimated by the position estimator 210. In so doing, the portable terminal may selectively compensate for the estimation error of the position information estimated by the position estimator 210 as shown in FIG. 5.

Figure 5:
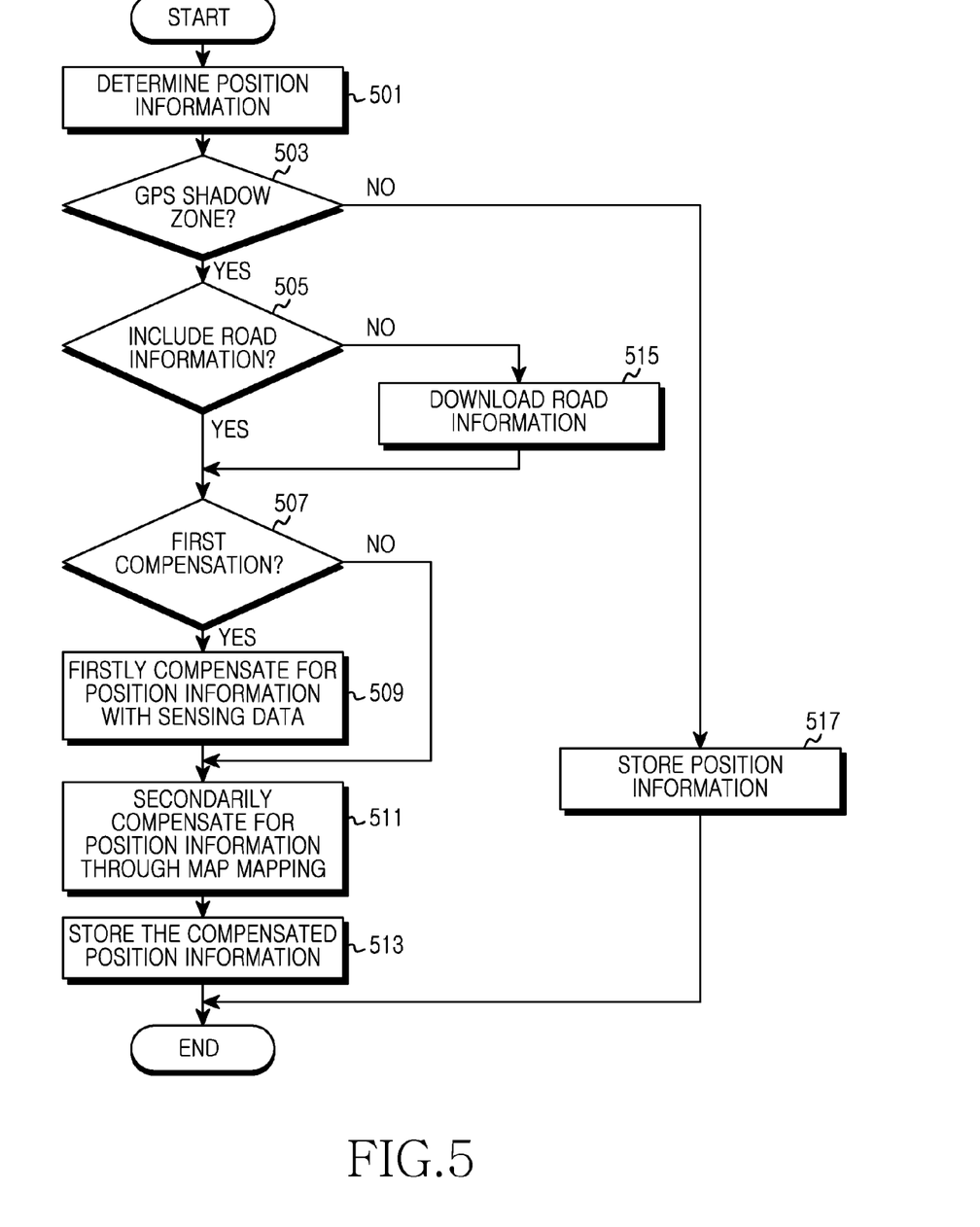
FIG. 5 illustrates a method for compensating for the estimation error of the position information in the portable terminal according to another exemplary embodiment of the present invention.

FIG. 5 illustrates a method for compensating the position information of the portable terminal according to another exemplary embodiment of the present invention.

In step 501, the portable terminal estimates its position. For example, the portable terminal estimates its position based on the reference location information obtained using the WPS, the NLP, and the cell identifier. Alternatively, the portable terminal can estimate its position based on the GPS data received from the GPS satellite.

In step 503, the portable terminal determines whether it travels in the GPS shadow zone by taking account of the estimated position information. In so doing, the portable terminal determines whether it is placed in the GPS shadow zone by using pre-stored GPS shadow zone information or by communicating with a server having the GPS shadow zone information.

When not traveling in the GPS shadow zone, the portable terminal recognizes that the position information estimated in step 501 is reliable. Hence, the portable terminal stores the position information estimated in step 501 as its position in step 517. In so doing, the portable terminal can provide the LBS, such as path guide and position determine, using the stored position information.

By contrast, in the GPS shadow zone, the portable terminal recognizes that the position information estimated in step 501 is not reliable. In step 505, the portable terminal determines whether it has the map data of its travel region.

When having the map data of the travel region of the portable terminal, the portable terminal determines whether to firstly compensate the position information estimated in step 501, in step 507. In so doing, the portable terminal may determine whether to perform the first position compensation using at least one of the sensing data provided from the sensing module 220 and the accuracy information of the satellite signal. For example, it is assumed that the portable terminal which travels in the downtown of high rise buildings sequentially estimates the first point 801, the second point 803, and the third point 805 using the satellite signals as shown in FIG. 8. When the portable terminal recognizes using the sensing data that the portable terminal travels straight after the second point 803, the portable terminal recognizes that the third point 805 falls outside the reference error range. Hence, the portable terminal determines to apply the first compensation to the third point 805.

If without the map data of the travel region of the portable terminal, the portable terminal downloads the map data including its travel region from the server in step 515. In so doing, the map data includes any one of the detailed map data including the building and road information to guide the path, and the simplified map data including only the simplified road data to compensate for the estimation error alone of the position information.

In step 507, the portable terminal determines whether to firstly compensate the position information estimated in step 501.

When not performing the first compensation on the position information, the portable terminal secondarily compensates the position information estimated in step 501 using the map matching in step 511. For example, when not firstly compensating the first point 801 and the second point 803 of FIG. 8, the portable terminal may match the first point 801 and the second point 803 to the road on the map.

Meanwhile, for the first compensation of the position information, the portable terminal firstly compensates the estimation error of the position information estimated in step 501, using the sensing data indicating the motion information of the portable terminal in step 509. For example, the portable terminal firstly compensate for the third point 805 of FIG. 8 to the position 807 by considering its heading direction and travel speed.

In step 511, the portable terminal secondarily compensates for the estimation error of the position information by matching the firstly compensated position information to the map data. For example, when the third point 805 is firstly compensated to the position 807 as shown in FIG. 8, the portable terminal performs the secondary compensation 809 on the position information by matching the firstly compensated position 807 to the road on the map.

In step 513, the portable terminal stores the secondarily compensated position Next, the portable terminal finishes this process.

In yet another embodiment, the portable terminal compensates the estimation error of the position information estimated by the position estimator 210 only in the GPS shadow zone.

Alternatively, the portable terminal can compensate for the estimation error of the position information estimated by the position estimator 210 even at a certain distance near the GPS shadow zone.

Alternatively, the portable terminal may compensate for the estimation error of the position information estimated by the position estimator 210 even when determining the movement into the GPS shadow zone by considering its travel direction.

After estimating the position of the portable terminal in FIGS. 4 and 5, the portable terminal determines whether there is the map data of its travel region in steps 505 and 515. In so doing, the portable terminal can determine the map data in steps 505 and 515 at any point between the position estimation and the second compensation of the position information.

Hereafter, a method for compensating for the position information in the portable terminal having the map data is described.

Figure 6:
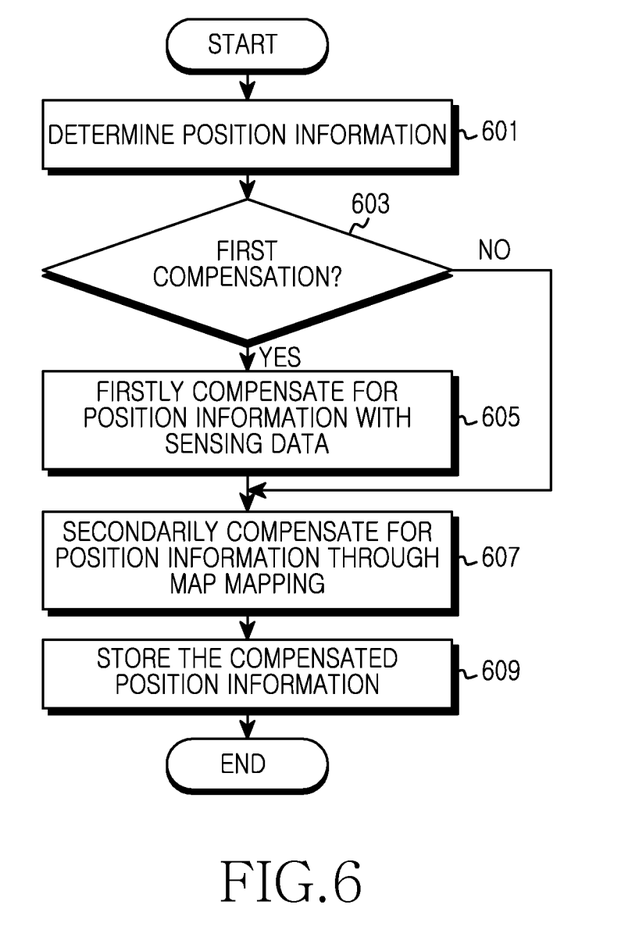
FIG. 6 illustrates a method for compensating for the estimation error of the position information in the portable terminal according to yet another exemplary embodiment of the present invention.

FIG. 6 illustrates a method for compensating for the position information in the portable terminal according to yet another exemplary embodiment of the present invention.

In step 601, the portable terminal estimates its position. For example, the portable terminal estimates its position based on the reference location information obtained using the WPS, the NLP, and the cell identifier. Alternatively, the portable terminal may estimate its position based on the GPS data received from the GPS satellite.

In step 603, the portable terminal determines whether to firstly compensate the position information estimated in step 601. That is, the portable terminal determines whether the position information estimated in step 601 is reliable. In so doing, the portable terminal may determine whether to perform the first position compensation using at least one of the sensing data provided from the sensing module 220 and the accuracy information of the satellite signal. For example, it is assumed that the portable terminal which travels in the downtown of high rise buildings sequentially estimates the first point 801, the second point 803, and the third point 805 using the satellite signals as shown in FIG. 8. When the portable terminal recognizes using the sensing data that the portable terminal travels straight after the second point 803, the portable terminal recognizes that the third point 805 falls outside the reference error range. Hence, the portable terminal determines to apply the first compensation to the third point 805.

When not applying the first compensation to the position information, the portable terminal secondarily compensates for the position information estimated in step 601 using the map matching in step 607. For example, when not firstly compensating the first point 801 and the second point 803 of FIG. 8, the portable terminal may match the first point 801 and the second point 803 to the road on the map.

Meanwhile, for the first compensation of the position information, the portable terminal firstly compensates for the estimation error of the position information estimated in step 601, using the sensing data indicating the motion information of the portable terminal in step 605. For example, the portable terminal firstly compensates for the third point 805 of FIG. 8 to the position 807 by considering its heading direction and travel speed.

In step 607, the portable terminal secondarily compensates for the estimation error of the position information by matching the firstly compensated position information to the map data. For example, when the third point 805 is firstly compensated to the position 807 in FIG. 8, the portable terminal applies the secondary compensation 809 to the position information by matching the firstly compensated point 807 to the road on the map.

In step 609, the portable terminal stores the secondarily compensated position information as its position information. In so doing, the portable terminal can provide the LBS such as path guide and position determine, using the stored position information.

Next, the portable terminal finishes this process.

In this yet another embodiment, the portable terminal compensates for the estimation error of the position information estimated by the position estimator 210.

Figure 7:
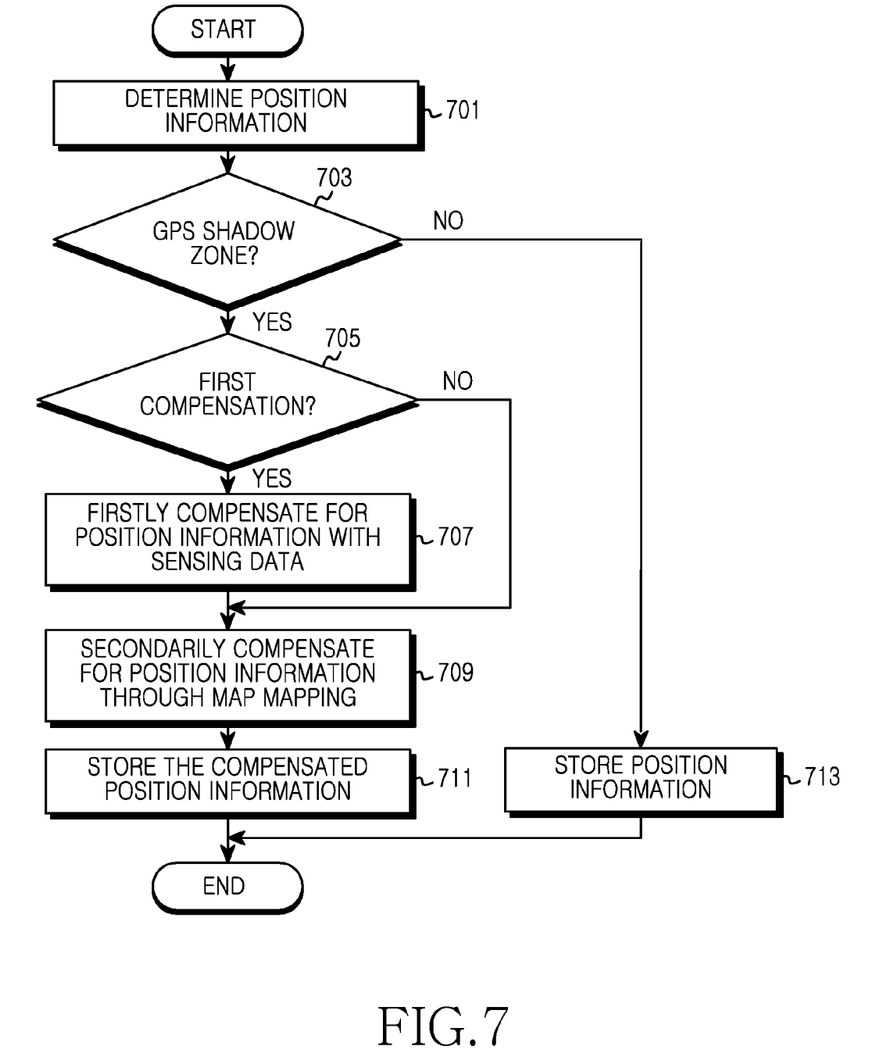
FIG. 7 illustrates a method for compensating for the estimation error of the position information in the portable terminal according to still another exemplary embodiment of the present invention.

In so doing, the portable terminal may selectively compensate for the estimation error of the position information estimated by the position estimator 210 as shown in FIG. 7.

FIG. 7 illustrates a method for compensating for the position information in the portable terminal according to still yet another exemplary embodiment of the present invention.

In step 701, the portable terminal estimates its position. For example, the portable terminal estimates its position based on the reference location information obtained using the WPS, the NLP, and the cell identifier. Alternatively, the portable terminal may estimate its position based on the GPS data received from the GPS satellite.

In step 703, the portable terminal determines whether it travels in the GPS shadow zone by taking account of the estimated position information. In so doing, the portable terminal determines whether it is placed in the GPS shadow zone by using the pre-stored GPS shadow zone information or by communicating with the server having the GPS shadow zone information.

When not traveling in the GPS shadow zone, the portable terminal recognizes that the position information estimated in step 701 is reliable. Hence, the portable terminal stores the position information estimated in step 701 as its position in step 713. In so doing, the portable terminal can provide the LBS, such as path guide and position determine, using the stored position information.

By contrast, in the GPS shadow zone, the portable terminal recognizes that the position information estimated in step 701 is not reliable. In step 705, the portable terminal determines whether to firstly compensate the position information estimated in step 701. In so doing, the portable terminal may determine whether to perform the first position compensation using at least one of the sensing data provided from the sensing module 220 and the accuracy information of the satellite signal. For example, it is assumed that the portable terminal which travels in the downtown of the tall buildings sequentially estimates the first point 801, the second point 803, and the third point 805 using the satellite signals as shown in FIG. 8. When the portable terminal recognizes using the sensing data that the portable terminal travels straight after the second point 803, the portable terminal recognizes that the third point 805 falls outside the reference error range. Hence, the portable terminal determines to apply the first compensation to the third point 805.

When not firstly compensate the position information, the portable terminal secondarily compensates for the position information estimated in step 701 using the map matching in step 709. For example, when not firstly compensating the first point 801 and the second point 803 of FIG. 8, the portable terminal may match the first point 801 and the second point 803 to the road on the map.

Meanwhile, for the first compensation of the position information, the portable terminal firstly compensates for the estimation error of the position information estimated in step 701 using the sensing data indicating its motion information in step 707. For example, the portable terminal firstly compensates for the third point 805 of FIG. 8 to the position 807 by considering its heading direction and travel speed.

In step 709, the portable terminal secondarily compensates for the estimation error of the position information by matching the firstly compensated position information to the map data. For example, when the third point 805 is firstly compensated to the position 807 as shown in FIG. 8, the portable terminal performs the secondary compensation 809 on the position information by matching the firstly compensated point 807 to the road on the map.

In step 711, the portable terminal stores the secondarily compensated position information as its position information. In so doing, the portable terminal can provide the LBS such as path guide and position determine, using the stored position information.

Next, the portable terminal finishes this process.

In this still another embodiment, the portable terminal compensates for the estimation error of the position information estimated by the position estimator 210 in the GPS shadow zone.

Alternatively, the portable terminal can compensate for the estimation error of the position information estimated by the position estimator 210 even at a certain distance near the GPS shadow zone.

Alternatively, the portable terminal may compensate for the estimation error of the position information estimated by the position estimator 210 even when determining the movement into the GPS shadow zone by considering its travel direction.

In the above exemplary embodiments, the portable terminal compensates for the position information estimated through the position estimation scheme, using the sensing data and the map matching. When not receiving the GPS signal, the portable terminal may estimate its position using merely the sensing data.

As set forth above, by compensating for the estimation error of the position information using at least one of the motion data of the portable terminal and the map matching in the portable terminal, the accurate position information can be estimated.

Since the estimation error of the position information is compensated only in the inaccurate position information estimation region, the complexity in the position information compensation can be reduced.

Further, since the estimation error of the position information is compensated using the map matching merely with the simplified map information, memory waste in storing the map information can be reduced.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for estimating position information in a portable terminal, comprising:
    estimating position information of the portable terminal;
    firstly compensating for an estimation error of the position information by considering motion information of the portable terminal;
    secondarily compensating for the estimation error of the firstly compensated position information according to a map matching scheme; and
    storing the position information of the compensated estimation error as the position information of the portable terminal.

2. The method of claim 1, wherein the estimating of the position comprises:
    estimating a position of the portable terminal using at least one of a Global Navigation Satellite System (GNSS) scheme, a WiFi Positioning System (WPS), a Network Location Provider (NLP), a triangulation scheme, and a position recognition scheme using a beacon.

3. The method of claim 1, wherein the motion information of the portable terminal comprises at least one of a travel speed, a heading direction, and an altitude of the portable terminal acquired through a sensing module comprising at least one of an acceleration sensor, a geomagnetic sensor, a gyroscope sensor, and an altitude sensor.

4. The method of claim 1, further comprising:
    after estimating the position information, determining whether to compensate for the estimation error of the position information, wherein, when determining to compensate for the estimation error of the position information, the estimation error of the position information is firstly compensated.

5. The method of claim 4, wherein the determining of whether to compensate for the estimation error of the position information comprises:
    determining GNSS shadow zone information; and
    determining whether to compensate for the estimation error of the position information of the portable terminal by considering the position information of the portable terminal and the GPS shadow zone information.

6. The method of claim 5, wherein the determining of the GPS shadow zone information comprises:
    downloading the GPS shadow zone information from a server.

7. The method of claim 5, wherein the GPS shadow zone covers a region such as downtown, where the portable terminal is not able to receive an accurate satellite signal because of at least one of multipath, signal attenuation, and signal interference.

8. The method of claim 1, further comprising:
    before the first compensation, determining whether to firstly compensate the estimation error of the position information by considering the motion information of the portable terminal,
    wherein, when determining the first compensation, the estimation error of the position information is firstly compensated.

9. The method of claim 8, further comprising:
    when determining not to firstly compensate, secondarily compensating for the estimation error of the position information of the portable terminal according to the map matching scheme; and
    storing the position information of the compensated estimation error as position information of the portable terminal.

10. The method of claim 1, further comprising:
after estimating the position information, determining whether map data of a travel region of the portable terminal is included; and
when the map data is not included, downloading the map data of the travel region of the portable terminal from a server,
wherein the secondarily compensating comprises secondarily compensating for the estimation error of the position information by matching the firstly compensated position information to the downloaded map data according to the map matching scheme.

11. An apparatus of a portable terminal, comprising:
a position estimator for estimating position information of the portable terminal;
a sensing module for detecting motion information of the portable terminal;
a position compensator for firstly compensating for an estimation error of the position information estimated by the position estimator by considering the motion information of the portable terminal detected by the sensing module and, and secondarily compensating for the estimation error of the compensated position information according to a map matching scheme; and
a storage unit for storing the position information compensated by the position compensator as the position information of the portable terminal.

12. The apparatus of claim 11, wherein the position estimator estimates the position of the portable terminal using at least one position estimation scheme of a Global Navigation Satellite System (GNSS) scheme, a WiFi Positioning System (WPS), a Network Location Provider (NLP), a triangulation scheme, and a position recognition scheme using a beacon.

13. The apparatus of claim 11, wherein the sensing module comprises at least one of an acceleration sensor, a geomagnetic sensor, a gyroscope sensor, and an altitude sensor, and detects the motion information of the portable terminal comprising at least one of a travel speed, a heading direction, and an altitude of the portable terminal.

14. The apparatus of claim 11, further comprising:
a controller for determining whether to compensate for the estimation error of the position information estimated by the position estimator,
wherein, when the controller determines to compensate for the estimation error of the position information estimated by the position estimator, the position compensator compensates for the estimation error of the position information.

15. The apparatus of claim 11, wherein the controller determines whether to compensate for the estimation error of the position information of the portable terminal by considering the position information estimated by the position estimator and GPS shadow zone information.

16. The apparatus of claim 15, wherein the controller downloads the GPS shadow zone information from a server.

17. The apparatus of claim 15, wherein the GPS shadow zone covers a region such as downtown, where the portable terminal is not able to receive an accurate satellite signal because of at least one of multipath, signal attenuation, and signal interference.

18. The apparatus of claim 11, wherein the position compensator determines whether to firstly compensate the estimation error of the position information estimated by the position estimator by considering the motion information of the portable terminal detected by the sensing module, and when determining the first compensation, the position compensator firstly compensates for the estimation error of the position information.

19. The apparatus of claim 18, wherein, when not determining the first compensation, the position compensator secondarily compensates for the estimation error of the position information estimated by the position estimator according to a map matching scheme.

20. The apparatus of claim 11, further comprising:
a controller for, when having no map data of a travel region of the portable terminal according to the position information estimated by the position estimator, downloading the map data of the travel region of the portable terminal from a server,
wherein the position compensator secondarily compensates for the estimation error of the position information by matching the firstly compensated position information to the map data downloaded to the controller according to the map matching scheme.

* * * * *